(12) United States Patent
Beaudoin et al.

(10) Patent No.: US 7,054,971 B2
(45) Date of Patent: May 30, 2006

(54) INTERFACE BETWEEN A HOST AND A SLAVE DEVICE HAVING A LATENCY GREATER THAN THE LATENCY OF THE HOST

(75) Inventors: Denis Beaudoin, Surrey (CA); Patrick Wai-Tong Leung, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 484 days.

(21) Appl. No.: 10/391,913

(22) Filed: Mar. 19, 2003

(65) Prior Publication Data

US 2004/0044814 A1 Mar. 4, 2004

Related U.S. Application Data

(60) Provisional application No. 60/407,462, filed on Aug. 29, 2002.

(51) Int. Cl.
*G06F 12/00* (2006.01)
(52) U.S. Cl. ......................................... 710/244; 710/39
(58) Field of Classification Search ................ 710/244, 710/39
See application file for complete search history.

(56) References Cited

U.S. PATENT DOCUMENTS

| | | | |
|---|---|---|---|
| 4,831,520 A | | 5/1989 | Rubinfeld et al. |
| 5,265,053 A | * | 11/1993 | Naradone et al. ............ 365/193 |
| 5,398,244 A | * | 3/1995 | Mathews et al. ............ 370/448 |
| 5,404,464 A | * | 4/1995 | Bennett ....................... 710/306 |
| 5,440,751 A | * | 8/1995 | Santeler et al. ................ 710/22 |
| 5,469,544 A | * | 11/1995 | Aatresh et al. ............. 710/110 |
| 5,471,638 A | | 11/1995 | Keeley |
| 5,479,619 A | | 12/1995 | Nagashige et al. |
| 5,504,874 A | * | 4/1996 | Galles et al. ................ 711/145 |
| 5,533,204 A | * | 7/1996 | Tipley ........................ 710/108 |
| 5,594,882 A | * | 1/1997 | Bell ........................... 711/212 |
| 5,640,527 A | * | 6/1997 | Pecone et al. .................. 711/5 |
| 5,721,882 A | | 2/1998 | Singh |
| 5,933,612 A | * | 8/1999 | Kelly et al. ................. 710/311 |
| 6,006,020 A | | 12/1999 | Cutter |
| 6,049,844 A | | 4/2000 | Matsui et al. |
| 6,081,860 A | * | 6/2000 | Bridges et al. ............. 710/110 |
| 6,085,271 A | * | 7/2000 | Smith et al. ................ 710/113 |
| 6,263,409 B1 | * | 7/2001 | Haupt et al. ................ 711/154 |
| 6,279,050 B1 | | 8/2001 | Chilton et al. |

(Continued)

FOREIGN PATENT DOCUMENTS

EP  1288785 A2 * 3/2003

*Primary Examiner*—Paul R. Myers
(74) *Attorney, Agent, or Firm*—Mark P. Watson

(57) ABSTRACT

An interface between a host and a slave device having a latency greater than the latency of the host is disclosed. The interface includes a register and a state machine. The state machine provides data to the host from any address in the slave in two host read cycles. The state machine receives a first request from the host for data stored at a first address in the slave at a first time. The state machine stores the data returned from the slave in response to the first request in the register at a second time. The state machine receives a second request from the host for data stored at a second address in the slave at a third time. The state machine provides the data specified in the first request to the host at a fourth time. The state machine is additionally adapted to provide data to the host from a second address in the slave in one read cycle.

38 Claims, 3 Drawing Sheets

U.S. PATENT DOCUMENTS

| | | | |
|---|---|---|---|
| 6,326,958 B1 * | 12/2001 | Gorny et al. | 345/204 |
| 6,385,094 B1 * | 5/2002 | Williams | 365/189.01 |
| 6,393,534 B1 * | 5/2002 | Chen et al. | 711/158 |
| 6,430,646 B1 | 8/2002 | Thusoo et al. | |
| 6,449,673 B1 * | 9/2002 | Gupta | 710/240 |
| 6,647,470 B1 * | 11/2003 | Janzen | 711/154 |
| 6,772,254 B1 * | 8/2004 | Hofmann et al. | 710/110 |
| 6,807,593 B1 * | 10/2004 | Moss et al. | 710/110 |
| 2003/0196019 A1 * | 10/2003 | Moertl et al. | 710/310 |

* cited by examiner

INTERFACE BETWEEN A HOST AND A SLAVE DEVICE HAVING A LATENCY GREATER THAN THE LATENCY OF THE HOST

This application claims the benefit of the provisional application Ser. No. 60/407,462 filed Aug. 29, 2002, entitled Method for Interfacing Fixed Latency CPUs to Slow Memory or Devices, which is incorporated by reference in its entirety.

FIELD OF THE INVENTION

The present invention relates generally to interfacing digital electronic devices and specifically to an interface between a host with a fixed latency and a slave device with a latency greater than the latency of the host.

BACKGROUND OF THE INVENTION

It is understood in the art of interfacing digital electronic devices that a host device ("host") and a slave device ("slave") must be compatible with each other in the time domain, that is, the slave must be able to accept data within a certain time period prescribed by the host during a write operation; and, similarly, the slave must be able to return data within a certain time period prescribed by the host during a read operation. The term "latency" is used in the art and herein to refer to the time interval between when a process starts and when it finishes. With respect to a host, latency refers to the overall time period required for the host to perform a read/write operation or "cycle." With respect to a slave, latency refers to the time period between when a slave receives a request and when it completes the request: for read operations, latency refers to the time period between when a slave receives a read request and when it outputs the data onto a data bus; and for write operations, latency refers to the time period between when a slave receives a write request and when it stores the data internally. Thus, another way of saying that the slave must be able to accept or return data within a certain time period prescribed by the host is to say that the slave is required to have a latency that is less than or equal to the latency of the host.

Many slaves, however, are capable of accepting or returning data only with a latency that is greater than the latency of the host. An example of this type of slave is a memory device. In a typical host read cycle, the host requests data and, after a time delay, reads the data. If the slave's latency is greater than the host's, the host will complete its read cycle before the slave places the requested data on its outputs. It should be clear that if the host is allowed to complete its read cycle before the requested data is on the slave's outputs, the host will read incorrect data.

One possible solution is to this problem is to speed up the slave by increasing the frequency at which it is clocked. However, increasing the clock frequency increases power consumption and heat generation. This translates into shorter battery life in mobile devices as well as the need to include means to dissipate the additional heat. In addition, increasing the clock frequency can produce electromagnetic radiation which interferes with other devices and can create clock synchronization and timing problems.

Several methods are generally employed for interfacing a host to a slave having a latency greater than that of the host. In one method, usually referred to as polling, the host makes a read or write request. The host then executes a program loop that repeatedly reads and tests a port line or a register until it detects a signal or a code sent by the slave to indicate that the slave has completed the request and that the data is available at a specified memory or register address.

In another method for interfacing a host to a slave having a latency greater than that of the host, usually referred to as the interrupt method, the host makes a read or write request to a slave and when the slave has completed the request, the slave asserts a signal on an input pin or line on the host for receiving an interrupt signal. The signal indicates to the host that the slave has completed the request and, in the case of a read operation, that the data is available to be read.

A third method for interfacing a host and to a slave having a latency greater than that of the host is usually referred to as the single handshake method. This method is typically used to prevent a host from completing a read/write cycle until such time as the slave is ready. In the single handshake method, the host has an input for a "hold-off" signal, such as WAIT or a continuation signal, such as ACK. In the case of a WAIT implementation, the host starts a read/write cycle and the slave responds by asserting a WAIT signal which is sent to the host's hold-off input. After the slave completes the request, the slave de-asserts the WAIT signal which allows the host to complete the read/write cycle. In the case of an implementation using a continuation signal, the host starts a read/write cycle, but does not complete it until it receives an ACK signal from the slave.

In the polling, interrupt, and handshake methods, when the host receives an indication from the slave that the slave has completed its part of the read/write cycle, the host finishes its part in the cycle, such as by reading the requested data. In effect, these methods extend the time period required for the host to perform a read/write cycle, that is, each method extends the latency of the host. More elaborate methods for interfacing a host to a slave are known, but these methods generally represent extensions of the basic methods described above for extending the latency of the host.

The techniques for extending the latency of the host and the method of speeding up the slave may not be desirable or possible in some computer systems. As mentioned, making the slave faster by increasing the frequency at which it is clocked increases power consumption, heat generation, and can produce electromagnetic interference. In addition, slave devices generally have an upper limit at which they can be clocked and still function correctly. The polling method is undesirable because it wastes CPU cycles which, in turn, wastes power and degrades system performance. The interrupt and handshake methods cannot be employed unless the host has an input for an interrupt or a hold-off signal. Some hosts are specifically designed without an input for an interrupt or a hold-off signal, that is, with a fixed latency, in an effort to minimize cost and power consumption. Thus, a significant problem is encountered when interfacing a fixed latency host to a slave having a latency greater than the latency of the host because the techniques for extending the latency of the host are not possible and the method of speeding up the slave may not be desirable or possible.

In view of the foregoing, it would be desirable to have an interface between a host and a slave having a latency greater than the latency of the host that could be used with a fixed latency host when the method of speeding up the slave is not be desirable or possible.

BRIEF SUMMARY OF THE INVENTION

The present invention is directed to an interface between a host and a slave device having a latency greater than the latency of the host. The interface circuit of the present invention may be employed in a computer system having a host, a slave device, and a software element directing the host. The software element directs the host to retrieve data stored in the slave by having the host perform a first read operation from a first address in the slave where the data is stored and by having the host perform a second read operation that specifies a surrogate address. The interface circuit includes a read data register and a state machine. The state machine is adapted to perform the steps of: receiving the read and address signals associated with a first read cycle at a first time; storing the data returned from the slave device in the read data register at a second time; receiving the read and address signals associated with a second read cycle at a third time; and providing the data to the host at a fourth time.

In another aspect of the interface circuit of the present invention, the state machine is adapted to respond to a third read operation from the host for data stored at a next sequential address, which again specifies the surrogate address. Specifically, the state machine performs the additional steps of: receiving a third request from the host for data in the slave device at fifth time; storing the data from the slave into the read data register at a sixth time; and enabling the output of the read data register at a seventh time so that said host can read the data.

The foregoing and other objectives, features, and advantages of the invention will be more readily understood upon consideration of the following detailed description of the invention, taken in conjunction with the accompanying drawings.

DETAILED DESCRIPTION OF A PREFERRED EMBODIMENT

Figure 1:
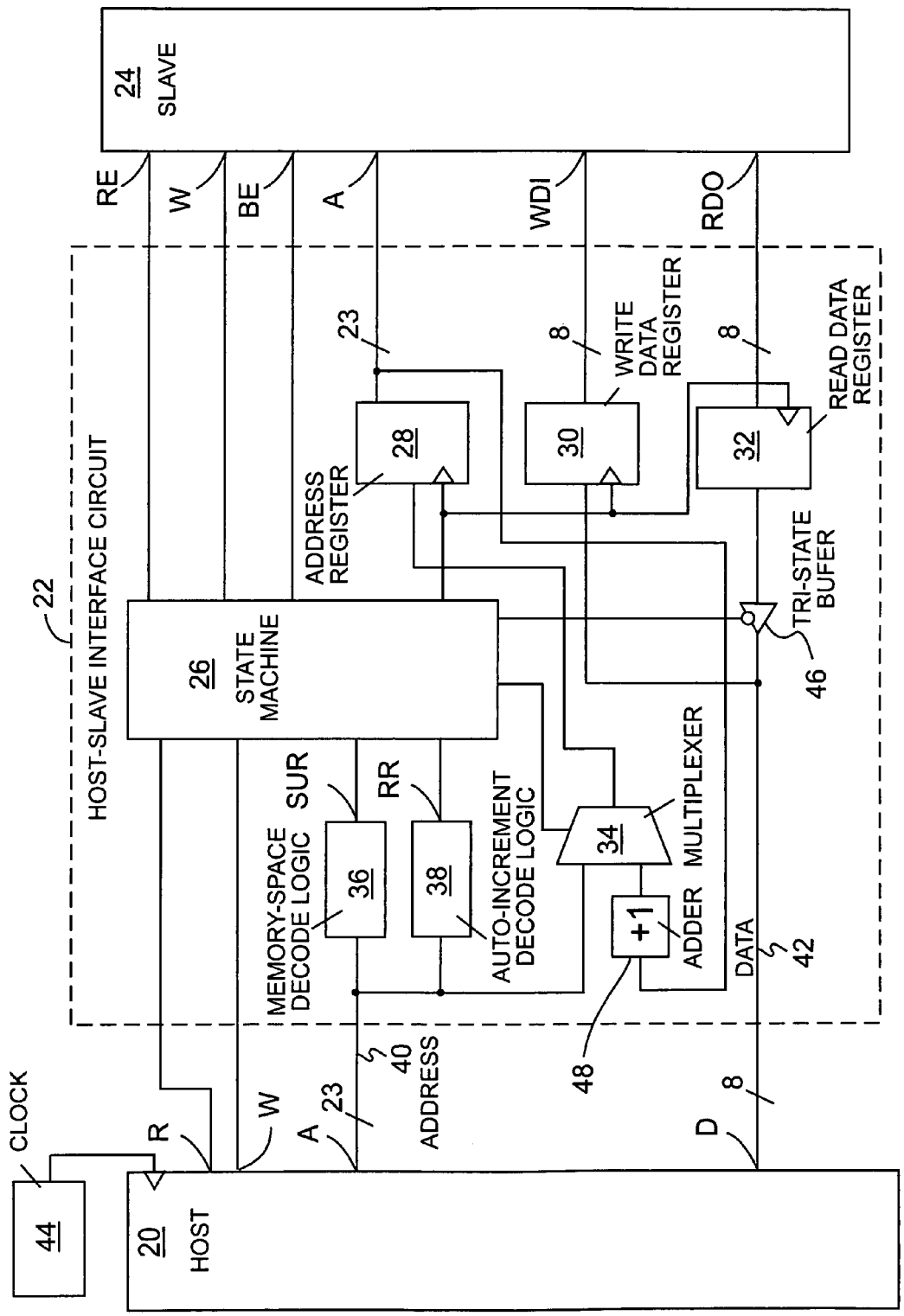
FIG. 1 illustrates a host, a slave, and a host-slave interface circuit including a state machine according to the present invention.

FIG. 1 is a block diagram of a system employing one embodiment of the present invention. A host 20 and a slave 24 are coupled to an exemplary host-slave interface circuit 22. A state machine 26 for sending and receiving signals for controlling the interface of the present invention is included within the circuit 22. In one preferred embodiment, the host 20 is a CPU, the slave 24 is a memory, the state machine 26 is a combinational logic circuit, and the host 20 does not have a hold-off input, that is, the host 20 has a fixed latency.

The present invention requires two host read cycles to return data in response to a single read request from the host. An outstanding benefit of the present invention is that each read request subsequent to an initial read request that is for data from the next sequential address requires just a single host read cycle. A further advantage of the present invention is that the slave 24 is presented with an address close to the beginning of a host read cycle.

The inputs and outputs of the host 20 that are used for sending a read/write request and for receiving a response to any request from a slave are coupled to the interface circuit 22 instead of being coupled to the slave 24. Specifically, the interface circuit 22 is coupled to the read ("R") and write ("W") outputs of the shown exemplary host 20. While the read and write outputs are shown as separate lines, it will be appreciated by one of ordinary skill that these signals could be transmitted as a high and a low state on a single line. The interface circuit 22 is also coupled to an address ("A") bus 40 and a bi-directional data ("D") bus 42 of the host 20. In the shown embodiment, the address bus is 23 bits wide and the data bus is 8 bits wide. These widths are exemplary and wider and narrower bus widths are contemplated. A source 44 for generating a clock signal is coupled to the clock input of the host 20.

The inputs and outputs of the slave 24 that are used for receiving a read/write request and for sending a response to any request are also coupled to the interface circuit 22 instead of being coupled to the host 20. Specifically, the interface circuit 22 is coupled to the following inputs of the slave 24: read ("RE"), write ("W"), byte enable ("BE"), address ("A"), and write data input ("WDI"). In addition, the interface circuit 22 is coupled to the read data output ("RDO") of slave 24. The read and write signal may be transmitted on a single line.

FIG. 1 also shows those components within the circuit 22 that are necessary for an understanding of the present invention. The circuit 22 has registers for storing addresses and data; specifically, the circuit includes an address register 28, a write data register 30, and a read data register 32. The circuit 22 also includes a multiplexer 34 for selecting between two possible address inputs. The circuit 22 includes memory-space decode logic 36 and auto-increment decode logic 38 that serve to decode addresses sent by the host 20. A tri-state buffer 46 is coupled to the output of the read data register 32 and serves to enable/disable the output of this register. An adder 48 is coupled to one of the inputs of multiplexer 34. Before describing the operation of the circuit, the internal and external couplings are described.

Referring now to the couplings between the host 20 and components of the circuit 22, the read and write outputs of the host 20 are coupled to the state machine 26. The address bus 40 is coupled to the multiplexer 34, the memory-space decode logic 36, and the auto-increment decode logic 38. In addition, the data bus 42 is coupled to the write data register 30 and the read data register 32.

With reference to the couplings between the slave 24 and the components of the circuit 22, the outputs of the state machine 26 are coupled to the read, write, byte enable inputs of the slave 24. The address register 28 is coupled to the address input A and the write data register 30 is coupled to the WDI of the slave 24. In addition, the RDO of the slave 24 is coupled to the input of the read data register 32.

With regard to the couplings between components of the circuit 22, the output of the multiplexer 34 is coupled to the input of the address register 28. The output of address register 28 is coupled to the input of adder 48, which, in turn, is coupled to the input of the multiplexer 34. The adder 48 is used to increment the address stored in the address register 28 so that an incremented address can be placed on one of the inputs of the multiplexer 34. The outputs of memory-space decode logic 36 and auto-increment decode logic 38 are coupled to the state machine 26. As shown in FIG. 1, the outputs of state machine 26 control the selection of input of multiplexer 34, whether tri-state buffer 46 is enabled to pass along the output of read data register 32, and the latching of data into registers 28, 30, and 32.

Before describing the operation of the circuit 22, the operation of the memory-space decode logic 36 and the auto-increment decode logic 38 is explained. Typically, the slave 24 will be assigned a range of sequential addresses within the addressing scheme employed by the host. When the host 20 performs a read or write operation, it may place an address on its outputs specifying any address within the range of addresses defined for the slave 24. Such an address will be referred to here as a "valid address." Alternatively, the host 20 may specify an address that is not included within the range of addresses defined for the slave 24. Such an alternative address will be referred to here as a "surrogate address." If the host specifies a valid address, the memory-space decode logic 36 will output a set-up read signal or "SUR." If the host specifies a surrogate address, the auto-increment decode logic 38 will output a register read signal or "RR."

Read Operation

Figure 3:
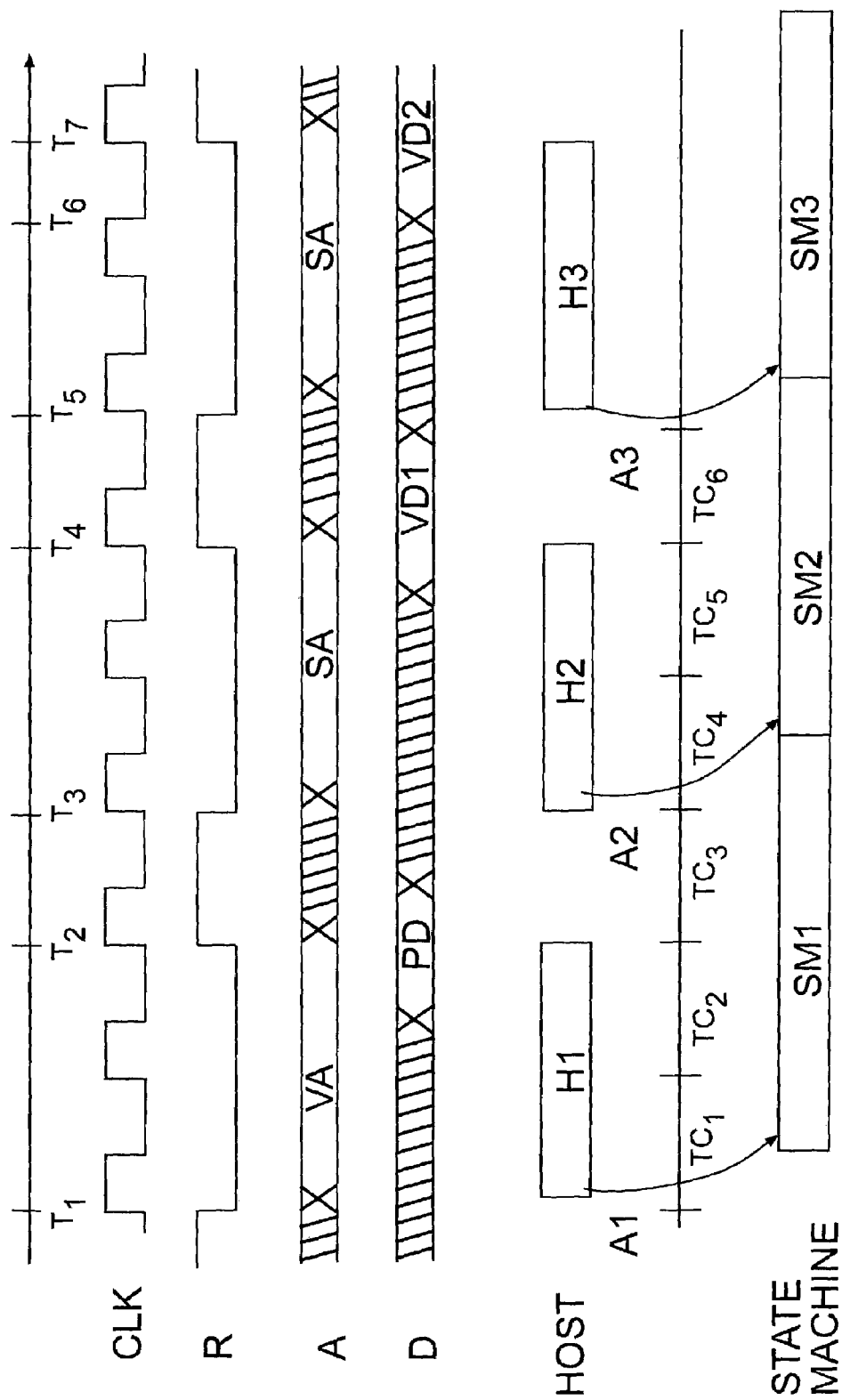
FIG. 3 is a timing diagram illustrating read operations according to the present invention.

The operation of circuit 22 is best understood by way of an example. FIG. 3 is a timing diagram which illustrates the state of a clock signal (CLK), the read signal (R), the address bus (A), and the data bus (D) at times $T_1$ to $T_7$. FIG. 3 also depicts when three host read cycles (H1, H2, H3) and state machine read cycles (SM1, SM2, SM3) occur with respect to times $T_1$ to $T_7$ and time cycles TC.

First Host Read Cycle. At a first time $T_1$, the host 20 starts a first host read cycle by asserting a read signal and placing a first address on the address bus 40. The first address in this example is a valid address, depicted as "VA" in FIG. 3. The memory-space decode logic 36 and the auto-increment decode logic 38 process the first address. The memory-space decode logic 36 asserts a set-up read signal (SUR) because the first address is a valid address. In response to the SUR signal, the state machine 26 sends a signal which causes the multiplexer 34 to select the address bus 40 as its input, which results in the first address being placed on the inputs of the address register 28. The state machine 26 also sends a signal that causes the first address to be latched into the address register 28. In addition, the state machine 26 asserts signals on the RE and BE inputs that cause the slave 24 to start fetching the data stored at the first address. At about a second time $T_2$, which is subsequent to the first time $T_1$, the host 20 reads the data on the data bus 42. The data that the host 20 reads is meaningless pseudo-data, depicted in FIG. 3 as "PD," which the host discards. The discarding of the pseudo-data is preferably implemented in software, but may be implemented in hardware.

After the slave 24 fetches the data located at the first address, it places the requested data on its read data outputs (RDO). When this occurs (at some time subsequent to time $T_2$), the state machine 26 latches the data into the read data buffer 32. The state machine 26 makes this data available to be read by the host 20 by enabling tristate buffer 46. In FIG. 3, the availability of this data on the data bus 42 is depicted as "VD1" for "valid data one."

Second Host Read Cycle. At a third time $T_3$, the host 20 starts a second host read cycle by asserting a read signal and placing a second address on the address bus 40. The second address in this example is a surrogate address, depicted as "SA". The memory-space decode logic 36 and the auto-increment decode logic 38 process the second address. The auto-increment decode logic 38 asserts a register read signal (RR) because the second address is not included within the address space defined for the slave 24. At about a fourth time $T_4$, the host 20 reads the data from read data buffer 32. The data that the host 20 reads—VD1—is the data that was fetched from the first address. The end of second host read cycle completes the process of reading the data stored at the first address.

In FIG. 3, the block H1 represents the host 20 performing a first host read cycle in which it requests data at a valid address and reads pseudo-data. The first host read cycle occurs during time cycles 1 and 2 ($TC_1$ and $TC_2$). The block SM1 represents the state machine 26 causing the requested data to be read from the specified valid address and made available to be read by the host 20. The state machine read cycle occurs during time cycles 1, 2, 3, and 4 ($TC_1$, $TC_2$, $TC_3$, and $TC_4$). The block H2 represents the host 20 reading the data (VD1) present on the data bus 42 and other processes described below. Arrows A1, A2, and A3 indicate that start of a host read cycle triggers a state machine cycle.

Multiple Read Cycle. If the host 20 only needs the data stored at a single address in the slave 24, the read operation is complete at the fourth time $T_4$. It will be appreciated, however, that a host commonly needs to read a series of data elements stored at sequential addresses in a slave. The state machine 26 is adapted to anticipate that the host 20 will request a number of data elements stored at sequential addresses. The steps that the state machine 26 takes in anticipation of a subsequent request for a data element stored at a next sequential address occur simultaneously with steps previously described. Thus, in order to illustrate how the state machine anticipates a read request, it is necessary to refer to a point in time previously discussed, that is, $T_2$, and then continue chronologically from that point.

Determination of Next Sequential Address. At the second time $T_2$ (about the time when the host 20 was reading the pseudo-data), the state machine 26 causes the multiplexer 34 to select the multiplexer input coupled to the adder 48 thereby causing a new address to be placed on the inputs of the address register 28. The new address is a "valid address" and will be referred to here as a "next sequential address." Preferably, the next sequential address is the next address in the sequence of addresses defined for the slave 24 that is subsequent to the address stored in register 28, that is, in this example, the next address that is subsequent to the first address. In an alternative preferred embodiment, the next sequential address is the next address prior to the address stored in register 28. In other alternative embodiments, the "next sequential address" is mathematically related to the address stored in register 28. For example, integers greater or less than one may be added or subtracted from the address stored in register 28. In yet other embodiments, operations such as multiplication or division are performed on the address stored in register 28 to obtain the next sequential address. The state machine 26 causes the next sequential address to be latched into the address register 28 (replacing the address previously stored therein) and also causes the slave 24 to fetch the data stored at the next sequential address.

As mentioned above, at a third time $T_3$, a second host read cycle starts. The host 20 asserts a read signal R and places a second address on the address bus 40, which in this example is a surrogate address (SA). The auto-increment decode logic 38 decodes the second address and asserts a register read signal RR. It should be noted that if the second address were not the surrogate address, but a valid address, the operation of the circuit 22 would proceed as described above for reading data stored at a single address.

At a fifth time $T_5$, a third host read cycle starts as indicated by the host 20 asserting a read signal R and again placing the surrogate address on the address bus 40. This example assumes that the host 20 wants to read the data stored at three sequential addresses in the slave 24.

Before sixth time $T_6$, the slave 24 returns the data stored at the next sequential address, designated as "VD2" in FIG. 3, and places it on the inputs of the read data buffer 32. At a sixth time $T_6$, the state machine 26 makes the data in the read data buffer 32 available to be read by the host 20 by enabling tri-state buffer 46.

At a seventh time $T_7$, subsequent to the sixth time $T_6$, the host 20 reads the data present on the data bus 42. The data that the host 20 reads is the data stored at the next sequential address (VD2). The state machine 26 can make the data stored at the next sequential address available to the host 20 at time $T_6$ because the slave 24 began the process of fetching the data shortly after the second time $T_2$. That is, the data at the next sequential address is available earlier because the process of fetching was begun before the start of the third host read cycle at the fifth time $T_5$.

It should be noted that at this point in the above described time sequence, the process of fetching the data stored at a subsequent "next sequential address" (that is in this example, at the first address plus two) has begun. When the host 20 placed a surrogate address on the address bus 42 at the start of the third host read cycle at a fifth time $T_5$ the host, in effect, signaled its request for the data stored at the subsequent "next sequential address."

According to the present invention, the host 20 may repeatedly perform host read cycles in which it specifies the surrogate address and data stored at each subsequent "next sequential address" will be returned at the end of the same host read cycle. As mentioned, a significant advantage of the present invention is that subsequent read requests from sequential addresses are accomplished in a single read cycle.

Figure 2:
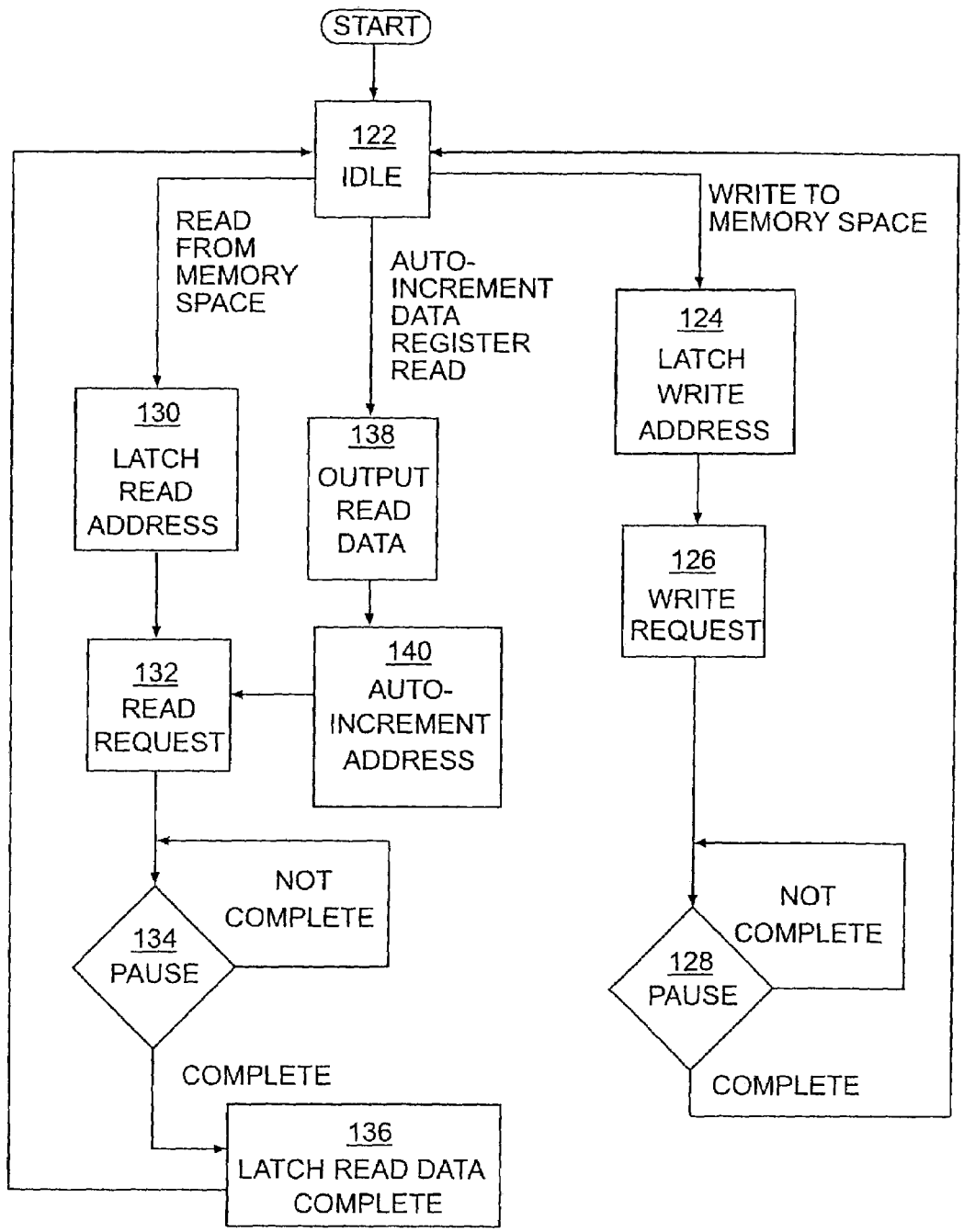
FIG. 2 illustrates the state machine of FIG. 1.

State Machine. FIG. 2 depicts a state diagram that shows the operation of the state machine 26. At start-up, the state machine 26 enters an idle state 122. If the read and set-up read signals are asserted, the state machine 26 enters the latch read state 130 where the address on the address bus 40 is latched into the address register 28. In the read request state 132, the state machine 26 asserts a read signal. In the pause state 134, the state machine 26 waits for the slave to fetch the data and place data on its outputs. After the slave has placed the requested data on its outputs, the state machine 26 latches the requested read data into read data register 32 during the latch read data state 136. The state machine 26 then returns to the idle state 122.

If the read and register read signals are asserted, the state machine 26 enters the output read data state 138 where the state machine 26 enables the tri-state buffer 46 thereby making the data stored in the read data buffer 32 available to the host 20. In the auto-increment address state 140, the state machine 26 causes the address register 28 to be incremented or decremented by a particular amount. The state machine 26 then transitions to states 132, 134, 136, and 122, which have been previously described.

Write Operation

The operation of the circuit 22 during a write operation is now described. Referring to FIG. 1, at a first time $T_1$, a first write cycle starts. This is indicated by the host 20 asserting a write signal W and placing address and write data on the respective busses 40, 42. The state machine 26 receives the write signal and causes the multiplexer 34 to direct the address to the address register 28 where it is latched. In addition, the state machine 26 causes the write data to be latched into the write data register 30. The state machine 26 asserts the write and byte-enable signals (W and BE) causing the slave 24 to begin the process of storing the write data.

In one embodiment, the slave 24 completes the process of storing the write data before the start of a second write cycle at a time $T_2$. In this embodiment, the host 20 may assert the signals necessary to initiate a second write operation at the second time $T_2$.

In one alternative embodiment, the slave 24 does not complete the process of storing the write data before the second time $T_2$. In this embodiment, the host 20 executes one or more NOP (no operation) instructions that allow the slave 24 to complete the process of storing the write data before the host 20 starts a second write cycle. In this alternative embodiment, the host 20 waits to assert the signals necessary to initiate a second write operation until a time $T_3$.

State Machine. Referring to FIG. 2, the operation of the state machine 26 during a write operation is described. When the host 20 asserts a write signal the state machine 26 enters a latch write state 124 where address and data are latched into the address register 28 and the write data register 30, respectively. In a write request state 126, the state machine 26 asserts write and byte-enable signals to the slave 24. In the pause state 128, the state machine 26 waits for the slave 24 to complete the process of storing the write data and, when complete, returns to the idle state 122.

In one preferred embodiment, the host-slave interface circuit 22 and the slave 24 are included on a single display controller chip. In this preferred embodiment, the slave 24 may be an embedded SRAM memory. In an alternate preferred embodiment, the host-slave interface circuit 22 and the slave 24 are included on separate chips.

The present invention has been described as an interface between a host 22 and a slave 24. It is contemplated that a host 22 may be a CPU, a DSP (digital signal processor), or any other type of processor known in the art. Similarly, the slave 24 may be a storage device, a memory, a memory controller, a display controller with embedded memory, a graphics controller with embedded memory, any device with embedded memory or registers, or any peripheral device in which the device itself, or registers or memory within the device are accessed using a memory-mapped I/O method.

For ease of explanation, the present invention has been described in terms of hardware. An alternative embodiment of the present invention is contemplated in which the disclosed method is implemented partially or entirely in software.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A method for interfacing a host and a slave device, the host having a fixed latency, the slave having a latency greater than the latency of the host and being identified by a plurality of predefined addresses, the method comprising the steps of:

making a first request for data stored at a first address in the slave device at a first time;

reading particular data at a second time, the particular data being data other than the data stored at the first address;

making a second request for the data stored at the first address by requesting data at a surrogate address at a third time, the surrogate address being an address other than one of the plurality of predefined addresses;

reading the data stored at the first address at a fourth time; and wherein the second time is subsequent to the first time, the third time is subsequent to the second time, and the fourth time is subsequent to the third time.

2. The method of claim 1, the method further comprising the steps of:
making a request for data stored at a next sequential address in the slave device by requesting data stored at the surrogate address at a fifth time;
reading the data stored at the next sequential address at a sixth time; and
wherein the fifth time is subsequent to the fourth time, and the sixth time is subsequent to the fifth time.

3. The method of claim 2, wherein the next sequential address is an address that is higher than the first address by at least one address.

4. The method of claim 2, wherein the next sequential address is an address that is lower than the first address by at least one address.

5. The method of claim 1, wherein the slave device is a memory.

6. The method of claim 1, wherein the slave device is a memory controller.

7. The method of claim 1, wherein the slave device is a display controller having an embedded memory.

8. The method of claim 1, wherein the host is a central processing unit.

9. The method of claim 1, wherein the host is a digital signal processor.

10. The method of claim 1, wherein the particular data is pseudo-data.

11. An apparatus for interfacing a host and a slave device, the host having a fixed latency, and the slave having a latency greater than the latency of the host and being identified by a plurality of predefined addresses, the apparatus comprising:
a register for storing data fetched from the slave device; and
a mechanism for:
causing the slave device to fetch data stored at a first address in response to a presentation by the host to the apparatus of the first address, the first address being one of the plurality of predefined addresses;
pausing until the slave device has fetched the data stored at the first address;
causing the data stored at the first address to be stored in the register; and
enabling an output of the register thereby making the data stored in the register available for reading by the host, wherein the enabling is in response to a first presentation by the host to the apparatus of a surrogate address, the surrogate address being an address other than one of the plurality of predefined addresses.

12. The apparatus of claim 11, wherein the mechanism is further adapted for:
causing the slave device to fetch data stored at a next sequential address in response to the presentation of the first surrogate address, the next sequential address being one of the plurality of predefined addresses;
causing the data stored at the next sequential address to be stored in the register; and
enabling the output of the register thereby making the data stored in the register available for reading by the host, wherein the enabling is in response to a presentation by the host to the apparatus of a second surrogate address.

13. The apparatus of claim 11, wherein the next sequential address is higher than the first address by at least one address.

14. The apparatus of claim 11, wherein the next sequential address is lower than the first address by at least one address.

15. The apparatus of claim 11, wherein the slave device is a memory.

16. The apparatus of claim 11, wherein the slave device is a memory controller.

17. The apparatus of claim 11, wherein the slave device is a display controller having an embedded memory.

18. The apparatus of claim 11, wherein the host is a central processing unit.

19. The apparatus of claim 11, wherein the host is a digital signal processor.

20. A computer system comprising:
a host having a fixed latency;
a slave device having a latency greater than the latency of the host and being identified by a plurality of predefined addresses; and
an interface circuit for interfacing the host and the slave device, wherein the circuit includes:
a register for storing data fetched from the slave device; and
a mechanism for:
causing the slave device to fetch data stored at a first address in response to a presentation by the host to the interface circuit of the first address, the first address being one of the plurality of predefined addresses;
pausing until the slave device has fetched the data stored at the first address;
causing the data stored at the first address to be stored in the register; and
enabling an output of the register thereby making the data stored in the register available for reading by the host, wherein the enabling is in response to a first presentation by the host to the interface circuit of a surrogate address, the surrogate address being an address other than one of the plurality of predefined addresses.

21. The system of claim 20, wherein the mechanism is further adapted for:
causing the slave device to fetch data stored at a next sequential address in response to the first presentation of the surrogate address, the next sequential address being one of the plurality of predefined addresses;
causing the data stored at the next sequential address to be stored in the register; and
enabling the output of the register thereby making the data stored in the register available for reading by the host, wherein the enabling is in response to a second presentation by the host to the interface circuit of a second surrogate address.

22. The system of claim 20, wherein the next sequential address is higher than the first address by at least one address.

23. The system of claim 20, wherein the next sequential address is lower than the first address by at least one address.

24. The system of claim 20, wherein the slave device is a storage device.

25. The system of claim 20, wherein the slave device is a memory controller.

26. The system of claim 20, wherein the slave device is a display controller having an embedded memory.

27. The system of claim 20, wherein the host is a central processing unit.

28. The system of claim 20, wherein the host is a digital signal processor.

29. A medium readable by a machine embodying a program of instructions executable by the machine to perform a method of interfacing a host and a slave device, the host having a fixed latency, the slave having a latency greater than the latency of the host and being identified by a plurality of predefined addresses, the method comprising the steps of:
 making a first request for data stored at a first address in the slave device at a first time;
 reading particular data at a second time subsequent to the first time, the particular data being data other than the data stored at the first address;
 making a second request for the data stored at the first address by requesting data at a surrogate address at a third time subsequent to the second time, the surrogate address being an address other than one of the plurality of predefined addresses; and
 reading the data stored at the first address at a fourth time subsequent to the third time.

30. The medium of claim 29, the method further comprising the steps of:
 making a request for data stored at a second address in the slave device at a fifth time subsequent to the fourth time by requesting data stored at the surrogate address; and
 reading the data stored at the second address at a sixth time subsequent to the fifth time.

31. The medium of claim 30, wherein the second address is higher than the first address by at least one address.

32. The medium of claim 30, wherein the second address is lower than the first address by at least one address.

33. The medium of claim 29, wherein the slave device is a memory.

34. The medium of claim 29, wherein the slave device is a memory controller.

35. The medium of claim 29, wherein the slave device is a display controller having an embedded memory.

36. The medium of claim 29, wherein the host is one of a central processing unit and a digital signal processor.

37. A method for fetching data from a slave device by a host having a fixed latency, the slave having a latency greater than the latency of the host and being identified by a plurality of predefined addresses, comprising the steps of:
 performing a first read cycle, the first read cycle including placing a first address on an address bus at a first time, the first address being one of the predefined addresses, and sampling data on a data bus at a second time subsequent to the first time; and
 performing a second read cycle subsequent to the first read cycle, the second read cycle including placing a surrogate address on the address bus at a third time, the surrogate address being other than one of the predefined addresses, and sampling data on the data bus at a fourth time subsequent to the third time, the data sampled at the fourth time being the data requested in the first read cycle.

38. The method of claim 37, further comprising the step of:
 performing a third read cycle subsequent to the second read cycle, the third read cycle including placing the surrogate address on the address bus at a fifth time, and sampling data on the data bus at a sixth time subsequent to the fifth time, the data sampled at the sixth time being data at a second address, the second address being one of the predefined addresses, and being one of: higher than the first address by at least one address, and lower than the first address by at least one address.

* * * * *